United States Patent

Crownover et al.

Patent Number: 5,254,360
Date of Patent: Oct. 19, 1993

[54] PROCESS FOR PRODUCING CERAMIC CAPACITORS WITH THINNER ELECTRODES

[75] Inventors: Joseph W. Crownover, La Jolla; Ben B. Meckel, Encinitas; Aubrey M. Burer, El Cajon, all of Calif.

[73] Assignee: BMC Technology Corporation, San Diego, Calif.

[21] Appl. No.: 737,319

[22] Filed: Jul. 29, 1991

[51] Int. Cl.⁵ .............................................. B05D 5/12
[52] U.S. Cl. ............................ 427/79; 427/126.3; 427/162; 427/226; 427/229; 427/282; 427/287; 427/380; 427/385.5; 427/397.7; 427/404; 427/407.1; 427/412.1; 427/419.2; 427/419.5; 204/192.1; 204/192.15; 204/192.17
[58] Field of Search ............... 427/79, 126.3, 162, 427/380, 385.5, 226, 229, 282, 397.7, 404, 407.1, 412.1, 419.2, 419.5, 287; 204/192.1, 192.15, 192.17

[56] References Cited

U.S. PATENT DOCUMENTS

| | | |
|---|---|---|
| 2,421,652 | 6/1947 | Robinson et al. |
| 2,478,322 | 8/1949 | Robinson et al. ............ 204/181 |
| 2,619,443 | 11/1952 | Robinson ..................... 427/79 |
| 2,694,016 | 11/1954 | Craven et al. ................ 427/79 |
| 4,061,584 | 12/1977 | Girard et al. ................. 427/79 |
| 4,453,199 | 6/1984 | Ritchie et al. ............... 427/79 |
| 4,510,175 | 4/1985 | Burn ........................... 427/79 |
| 4,572,843 | 2/1986 | Saito et al. .................. 427/79 |
| 4,985,098 | 1/1991 | Kohno et al. ................ 427/79 |

Primary Examiner—Janyce Bell
Attorney, Agent, or Firm—Frank D. Gilliam

[57] ABSTRACT

A process for producing capacitors having thinner electrodes on dielectric substrates for use in multilayer ceramic capacitors which use less precious metal ink and produce thinner capacitors. Basically, the process begins with coating a support with a mixture of a finely divided ceramic material and a resin to form a green ceramic dielectric substrate of substantially uniform thickness but with a necessarily rough surface. A coating of resin is applied over the green ceramic to form a substantially smooth surface. A desired pattern in an ink comprising precious metal particles in a resin is formed, such as by silk screening, on the coated ceramic to form the electrode. Because of the smooth resin surface and finer metal particles, the ink coating may be relatively thin. The composite may then be fired to produce a capacitor suitable for use in monolithic multilayer capacitors.

16 Claims, 2 Drawing Sheets

PROCESS FOR PRODUCING CERAMIC CAPACITORS WITH THINNER ELECTRODES

BACKGROUND OF THE INVENTION

This invention relates in general to processes for making ceramic capacitors and, more particularly, to a process which requires less precious metal ink and produces thinner electrodes and substrates having electrical properties equal or superior to prior thick capacitors using greater amounts of precious metal.

Conventional multilayer capacitors generally consist of a number of alternate layers of conductive metal electrodes and dielectric layers, all connected in parallel so as to provide an increase in the electrical capacitance for a given area. This structure is generally referred to as a monolithic construction of electrodes and dielectrics or as a monolithic capacitor. The dielectric may be an insulating synthetic resin, a ceramic material or other insulator. A variety of conducting materials, typically metals, may be used in the electrodes. The thinner the electrodes and dielectric substrates can be made, and the more efficient the electrodes, the smaller the capacitor can be made. This size reduction is important in modern, very compact, electronic systems.

Prior capacitors for these applications are generally made by casting a mixture of ceramic particles and resin, in paint like form, onto a plastic film support. This cast dielectric material is dried, resulting in a rough surface due to the particulate nature of the ceramic. The dielectric substrate is then printed by silk screen processes with an ink made up of finely divided precious metal particles in a resin carrier. In order to achieve the necessary conductivity in the electrode, it is necessary to apply sufficient ink to fill the irregularities in the ceramic surface, then apply sufficient additional ink to produce a coating with a minimum thickness over the ceramic high points for the intended application. Typically, a 0.001 inch thick ceramic substrate will exhibit a roughness of approximately 6 to 7KÅ. Thus, conventionally, an electrode thickness of about 54 kÅ is required to provide the needed conductibility, where about 7 kÅ of the precious metal ink will be required to fill the irregularities in the ceramic surface. The metal ink lodged in the roughness of the ceramic surface contributes little, if anything, to the conductivity of the metal electrode. Thus, if there were no roughness only about 47kÅ of metal ink would be needed.

Thus, there is a continuing need for improved processes for making metal coated ceramic substrate capacitors for monolithic multilayer capacitor assemblies which have decreased thicknesses and which use a smaller quantity of the expensive precious metal ink.

SUMMARY OF THE INVENTION

It is, therefore, an object of this invention to provide a process for producing thinner ceramic substrates having the required performance in conjunction with thinner precious metal electrode layers. Another object of this invention to provide a process for producing these fully effective but thinner metal and ceramic substrates in ceramic capacitors.

The above-noted objects, and others, are accomplished in accordance with this invention by a process which, basically, comprises the steps of forming a layer of ceramic particles dispersed in a resin matrix, drying the layer, applying a coating of resin to fill depression, pores and surface interstices in the ceramic particle surface to produce a substantially smooth surface corresponding to the ceramic high points, drying the resin, forming a precious metal layer to a substantially uniform thickness having the desired conductive characteristics (preferably by coating a mixture of metal particles in a resin carrier onto the coated green ceramic), drying the resin and vitrifying the assembly to produce an effective capacitor. The capacitor can then be assembled into a monolithic multilayer capacitor of improved performance, lesser thickness and lower cost.

The improved process provides better electrode electrical conductivity for a given thickness of metal coating, using less precious metal to obtain the required degree of conductivity. The metal coating surface produced by the improved process are found to have greater reflectivity in the thermal spectrum, so that less thermal energy is absorbed and the capacitor structure is more resistant to heating damage. Because of the thinner metal coating, the capacitors can be produced at a greater production rate.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
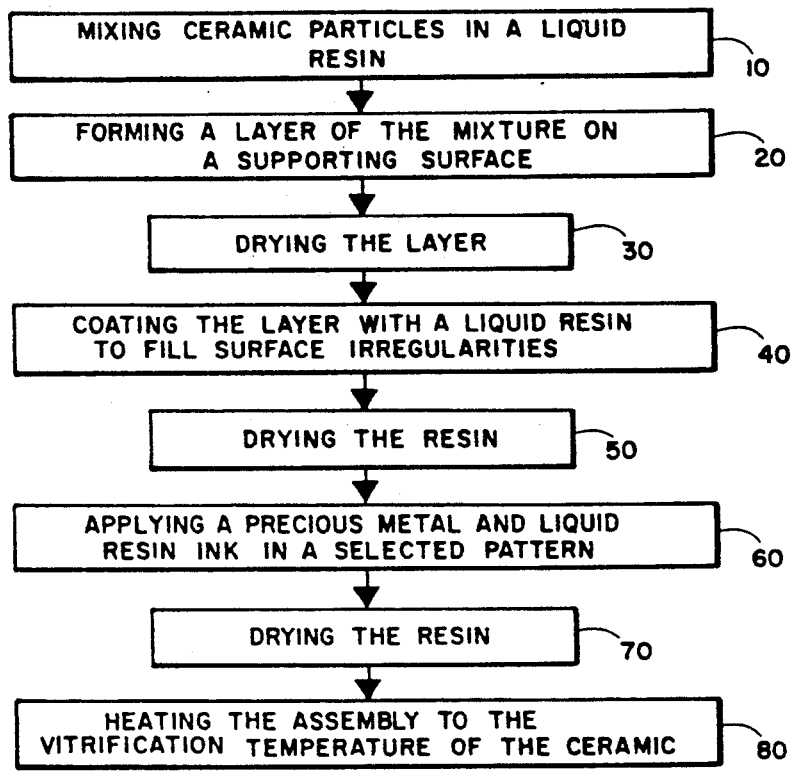
FIG. 1 is a block diagram illustrating the process of this invention.

Referring now to FIG. 1, there is seen a schematic block diagram illustrating the steps in the process of this invention. A quantity of finely divided dielectric ceramic particles, typically formed from oxides of metals such as barium, strontium, titanium or mixtures thereof is dispersed in a liquid resin matrix as indicated in Block 10. Preferably, the particles have average diameters of from about 0.5 to 2.0 $\mu$m (micrometers or microns). Good results are obtained with a mixture weight ratio of about 50 wt % liquid resin to about 50 wt % ceramic particles. Any suitable resin/solvent mixture may be used. Preferred resins include vinyl polymers and acrylic polymers in an toluene or ethanol solvent. The resinous material typically comprises about 20 wt % resin and about 80 wt % solvent and has a consistency similar to conventional house paint.

A layer of the mixture is spread onto a supporting surface, as indicated in Block 20. While the layer may have any suitable thickness, best results are obtained with layers of about 0.001 to 0.005 inch thickness. The layer is then heated to a moderate temperature, typically in the 100° to 200° C. range to dry the resin as indicated in Block 30.

A liquid resin is then coated over the ceramic layer to fill depressions, pores and other irregularities in the layer surface and provide a substantially smooth surface as indicated in Block 40. While any suitable resin may be used, the same resin used in the ceramic/resin mixture is preferred for compatibility. The resin can be spread in any suitable manner, such as wiping with a soft rubber wiping strip. The coating is then dried at moderate temperature as indicated in Block 50. In order to achieve the smoothest possible surface, the coating and drying steps of Blocks 40 and 50 may be repeated one or more times.

A mixture or ink made up of precious metal particles in a liquid resin matrix is then applied to the assembly in a selected pattern, as indicated in Block 60. Any suitable method of application may be used. Photoresist pattern forming techniques in with a layer of metal particles is formed such as by cathode sputtering, a photoresist layer is formed and exposed to the selected pattern, then the unwanted areas of photoresist and metal layer are removed, are suitable. Silk screen printing of the metal pattern is often preferred for simplicity and effectiveness, especially where a complex pattern is to be formed.

Any suitable precious metal particles may be used. An alloy of palladium and silver or pure palladium gives best results in most cases and is, therefore preferred. Other metals such as platinum or gold that have melting points above the firing temperature of the green ceramic, typically above about 1200° C. may be used if desired. Particles of any suitable size may be used. While excellent results are obtained with particles in the 0.1 to 1 μm range, for optimum results, particles in the 0.25 to 0.03 μm are preferred. Any suitable resin, in any suitable proportions may be used. The resins described above, in a ratio of about 50 wt % resin to about 50 wt % metal particles give excellent results. After silk screening is complete, the resin is dried at moderate temperatures as indicated in Block 70. If desired, the metal layer may be formed by any other process, such as cathode sputtering as detailed in our co-pending U.S. Pat. Application, Ser. No. 07/610,780, filed Nov. 8, 1990, now abandoned. Finally, the assembly is heated to the conventional vitrification temperature of the particular green ceramic used as indicated in Block 80.

The resulting capacitors can be removed from the support and used in any appropriate capacitor assembly, such as monolithic multilayer capacitors. As is detailed below, these capacitors may be considerably thinner than conventional capacitors, permitting assembly of relatively smaller multilayer capacitors. Also, considerable savings result from the ability to use much thinner precious metal layers.

Figure 2:
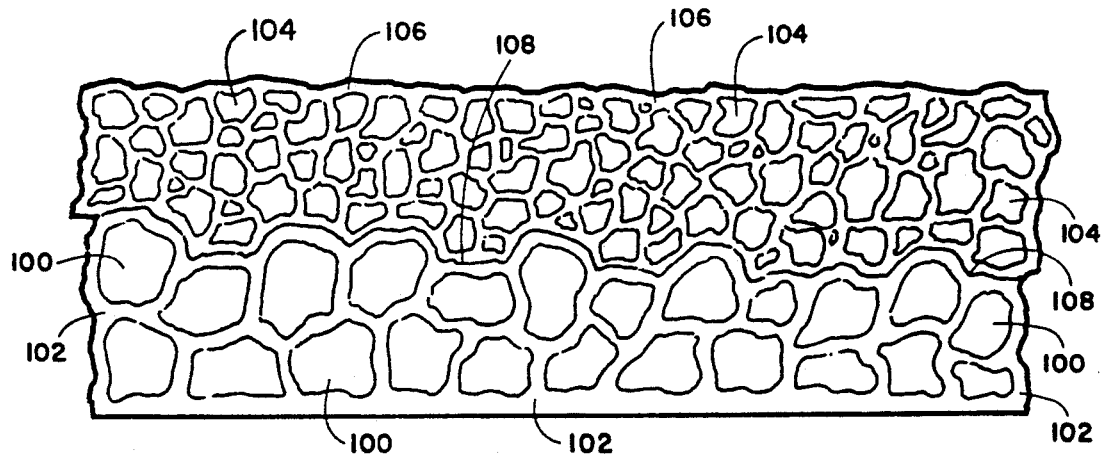
FIG. 2 is a vertical section through a capacitor produced by the process of the prior art.

Referring now to FIG. 2, there is seen a vertical section through a capacitor made by the process of the prior art. Particle sizes are exaggerated somewhat for clarity of illustration. Ceramic particles 100 are separated by a thin bonding film of dry resin 102. Particles 104 of precious metal are separated by dry resin film 106. The upper surface of the ceramic particle layer is irregular, having depressions and irregularities corresponding to the shapes of the ceramic particles 100 along the top of the layer. Typically the average depth of the depressions is on the order of about 0.8 to 1 μm. We have found that the conductivity of the metal particle layer depends almost entirely on the average minimum thickness of the layer across the ceramic substrate, where the metal particles filling the depressions contributes little, if anything, to the conductivity across the capacitor. Typically, in order to obtain the required conductivity in a capacitor made by the prior art process, a metal particle layer having a maximum thickness of about 54.2 kÅ (kilo Angstroms), with about 7 kÅ wasted in filling the depressions.

Figure 3:
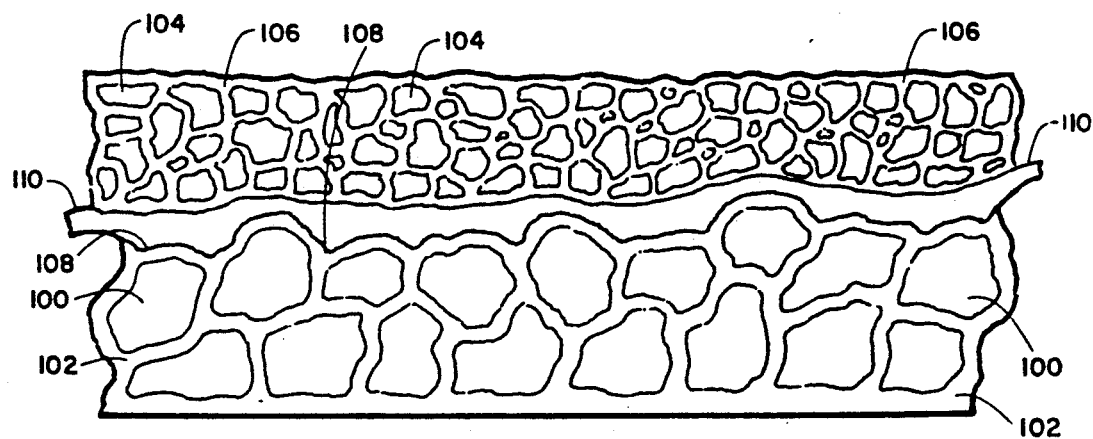
FIG. 3 is a vertical section through a capacitor produced by the process of this invention.

The process of this invention, as illustrated in FIG. 1, produces a capacitor as shown in vertical section in FIG. 3. The layer of ceramic particles 100 and resin 102 is substantially identical to that shown in FIG. 2. Here, however, a layer of resin 110 is spread across the surface of the ceramic substrate, substantially filling the depressions 108. The surface of resin 110 is smooth to within at least about 0.4 μm, so that at least about 0.4 to 0.6 μm (and possibly up to 0.8 to 1.0 μm) of the precious metal is saved. If desired, additional coatings 110 can be applied and dried to further smooth the surface.

When the capacitor is vitrified, both the resin films 102 and 106 on the ceramic and metal particles and the resin layer 110 disappear, leaving a substantially smooth interface between the metal and vitrified ceramic layers (as opposed to the rough interface obtained when an assembly such as that of FIG. 1 is vitrified). The final capacitor will have up to about a 20% reduction in overall thickness due to the thinner metal layer and thinner ceramic substrate. One portion of the improved process permits a precious metal saving of up to about 13%. This effect, in combination with the use of very small metal particles, facilitates a total reduction of electrode thickness of about 20% which results in the overall capacitor thickness reduction of about 20%.

The following examples provide details of preferred embodiments of the process of this invention. Parts and percentages are by weight unless otherwise indicated.

EXAMPLE I

Figure 4:
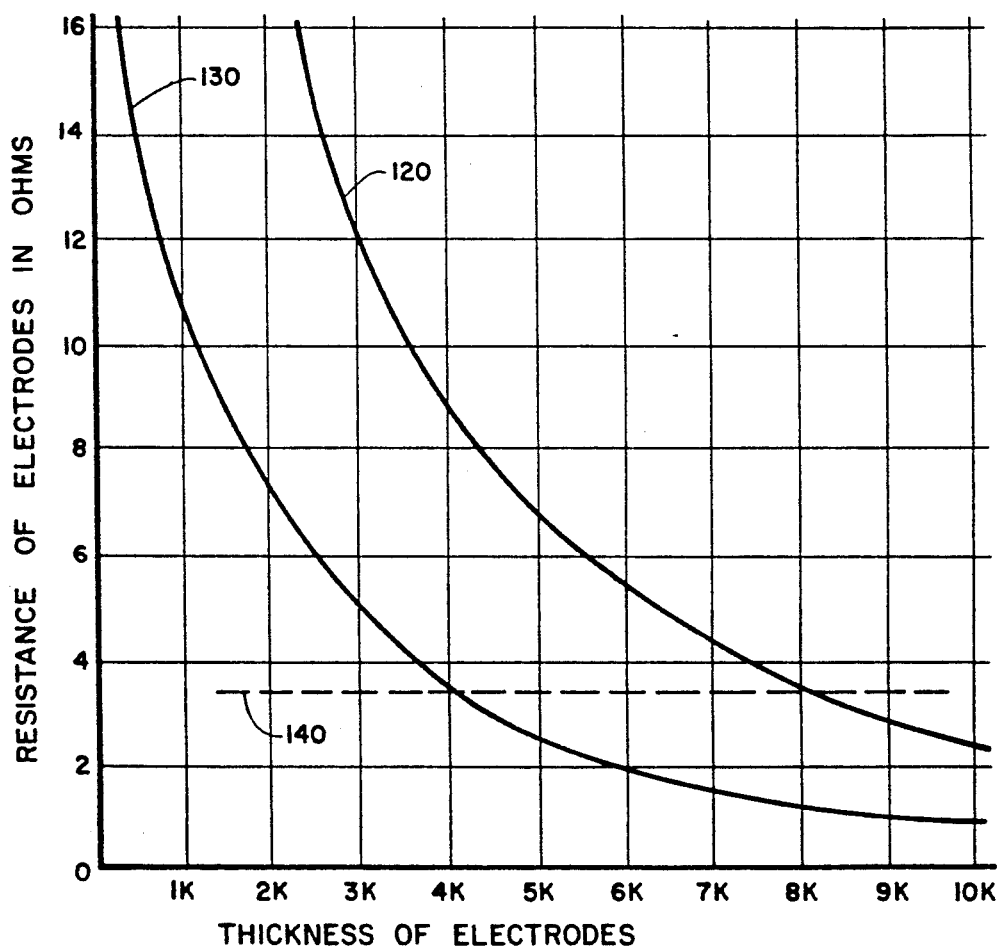
FIG. 4 is a plot of electrode thickness against resistance, showing improved conductivity with thinner electrodes produced by the process of this invention

A mixture of finely divided titanium dioxide particles having diameters of about 1 to 2 μm and a liquid resin made up of a vinyl polymer in toluene is prepared. The mixture is about half particles and have resin mixture by weight, the resin mixture being about 80 wt % solvent and 20 wt % resin. A number of samples of the mixture are coated onto polyester film supports and dried to green ceramic thicknesses of about 0.001 inch. An ink mixture is prepared consisting of about half metal particles having average diameters of about 0.5 to 1 μm. The metal particles are an alloy consisting of about 85 wt % silver and about 15 wt % palladium and the liquid resin is the vinyl mixture described above. About half of the green ceramic substrates are coated with an additional quantity of the vinyl resin solution to substantially fill the depressions between ceramic particles at the substrate surfaces. The metal particle ink is then applied in a selected pattern to each of the coated and uncoated substrates to produce sets of uncoated and coated substrates having electrode coatings having dried thicknesses of 0.5, 1, 1.5, 2, 3, 4, 6, 8, and 10 thousand Angstroms (KÅ). All of the assemblies thus produced are vitrified to form test capacitors. Resistance tests are then conducted and the results plotted in FIG. 4, with line 120 indicating results for the uncoated ceramic substrate and line 130 indicating results with the coated ceramic substrate having resin filled surface depressions. At every electrode thickness, the electrodes formed on the coated substrates show lower resistance. For the purposes of this example, an acceptable conductivity level is considered to require a resistance of no greater than 3.5 ohms, as indicated by line 140. As shown, with the coated ceramic substrate, an electrode thickness of about 4KÅ provides acceptable conductivity, while the uncoated substrate requires an electrode thickness of about 8KÅ. Thus, with the uncoated substrate considerable precious metal is wasted.

EXAMPLE II

The experiment of Example I is repeated, except that in this case an acrylic polymer in an ethanol solvent is used in place of the vinyl polymer in toluene, the green ceramic particles are formed from a mixture of barium and strontium oxides and the metal particles are an alloy of palladium and silver and have average diameters in the 0.25 to 0.3 μm range. Several ceramic substrate thicknesses in the 0.0004 to 0.001 thickness range are prepared. The finer metal particles are found to provide a much smoother ink surface which allow the ink deposition layer to be up to about 8% thinner while retaining the desired conductivity. Excellent results are achieved with thinner substrates. In general, a 20% reduction in substrate thickness with this process produces results equal to those previously achieved with full thickness substrates. The Tests again show that the metal particles printed onto the coated green ceramic substrate produce a much thinner satisfactorily conductive electrode then when printed on the uncoated substrate. The difference is even greater, apparently due to slightly improved conductivity through an ink having the more finely divided metal particles. The combination of reduced dielectric thickness and reduced electrode thickness permits an increase an overall capacitor volumetric efficiency of 50% or more without reducing capacitor performance.

Other applications, variations and ramifications of this invention will occur to those skilled in the art upon reading this disclosure. Those are intended to be included within the scope of this invention, as defined in the appended claims.

We claim:

1. The process for making ceramic capacitors which comprises the steps of:
    mixing ceramic particles in a liquid resin;
    forming a layer of the resulting mixture of ceramic particles in a liquid resin on a supporting surface;
    drying said layer;
    coating the layer with a liquid resin to fill surface depressions and irregularities;
    drying said resin to provide a substantially smooth surface;
    applying onto said smooth surface a mixture of precious metal particles in a liquid resin by silk screen printing in a pattern;
    drying the resin; and
    heating the resulting assembly to the vitrification temperature of said ceramic particles.

2. The process according to claim 1 wherein said precious metal is selected from the group consisting of palladium and alloys of silver and palladium.

3. The process according to claim 1 wherein said ceramic particles have average diameters in the 0.5 to 2 μm range and are formed from an oxide of a metal selected from the group consisting of barium, strontium, titanium and mixtures thereof.

4. The process according to claim 1 wherein each of said resins is a polymer selected from the group consisting of vinyl, acrylic, and mixtures thereof and said solvent is selected from the group consisting of ethanol, toluene and mixtures thereof.

5. The process according to claim 1 wherein said precious metal particles have average diameters in the range of 0.2 to 1.0 μm and the resulting metal layer has increased reflectivity in the thermal spectrum.

6. The process according to claim 5 wherein said precious metal particles have average diameters in the range of about 0.25 to 2.0 μm.

7. The process according to claim 1 wherein said steps of coating the dried ceramic particle layer with a liquid resin and drying the resin are repeated at least one additional time.

8. The process for making ceramic capacitors which comprises the steps of:
    mixing ceramic particles in a liquid resin;
    forming a layer of the resulting mixture of ceramic particles in a liquid resin on a supporting surface and drying said layer;
    coating the layer with a liquid resin to substantially fill surface depressions and irregularities and drying said resin to provide a substantially smooth surface;
    applying a coating of a precious metal in a pattern to said smooth surface; and
    heating the resulting assembly to the vitrification temperature of said ceramic particles.

9. The process according to claim 8 including repeating said steps of coating with a liquid resin and drying the resin at least on additional time, whereby the surface is further smoothed.

10. The process according to claim 8 wherein said metal coating is formed by silk screen printing a mixture of precious metal particles in a liquid resin onto the dried resin coated surface in a pattern.

11. The process according to claim 10 wherein said precious metal particles have average diameters in the range of 0.2 to 1.0 μm and the resulting metal layer has improved reflectivity in the thermal spectrum.

12. The process according to claim 11 wherein said precious metal particles have average diameters in the range of about 0.25 to 20 μm.

13. The process according to claim 8 wherein said metal layer is applied by cathode sputtering.

14. The process according to claim 8 wherein said ceramic particles have average diameters in the 0.5 to 2 μm range and are formed from an oxide of a metal selected from the group consisting of barium, strontium, titanium and mixtures thereof.

15. The process according to claim 2 wherein each of said resins is selected from the group consisting of polyvinyl resins, acrylic resins, and mixtures thereof and said solvent is selected from the group consisting of ethanol, toluene and mixtures thereof.

16. The process according to claim 8 wherein said precious metal is selected from the group consisting of palladium and alloys of silver and palladium.

* * * * *